United States Patent
Malek-Mohammadi et al.

(10) Patent No.: US 12,003,353 B2
(45) Date of Patent: Jun. 4, 2024

(54) COVERAGE ENHANCED RECIPROCITY-BASED PRECODING SCHEME

(71) Applicant: Telefonaktiebolaget LM Ericsson (publ), Stockholm (SE)

(72) Inventors: Mohammadreza Malek-Mohammadi, Solna (SE); Karl Werner, Segeltorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 17/428,841

(22) PCT Filed: Nov. 11, 2019

(86) PCT No.: PCT/IB2019/059678
§ 371 (c)(1),
(2) Date: Aug. 5, 2021

(87) PCT Pub. No.: WO2020/161537
PCT Pub. Date: Aug. 13, 2020

(65) Prior Publication Data
US 2022/0123971 A1    Apr. 21, 2022

Related U.S. Application Data

(60) Provisional application No. 62/802,064, filed on Feb. 6, 2019.

(51) Int. Cl.
*H04L 25/03* (2006.01)
*H04B 7/06* (2006.01)
*H04L 25/02* (2006.01)

(52) U.S. Cl.
CPC ..... *H04L 25/03898* (2013.01); *H04B 7/0617* (2013.01); *H04L 25/0212* (2013.01); *H04L 25/0224* (2013.01)

(58) Field of Classification Search
None
See application file for complete search history.

(56) References Cited

U.S. PATENT DOCUMENTS

| | | | |
|---|---|---|---|
| 11,757,543 B2* | 9/2023 | Chervyakov | H04B 17/345 370/252 |
| 2010/0099362 A1* | 4/2010 | Jongren | H04B 17/24 455/67.14 |

(Continued)

FOREIGN PATENT DOCUMENTS

EP    3413484 A1    12/2018

OTHER PUBLICATIONS

Invitation to Pay Additional Fees and Partial Search for International Patent Application No. PCT/IB2019/059678, dated Jan. 23, 2020, 15 pages.

(Continued)

*Primary Examiner* — Otis L Thompson, Jr.
(74) *Attorney, Agent, or Firm* — Sage Patent Group

(57) ABSTRACT

Systems and methods for coverage enhanced reciprocity-based precoding schemes are provided. In some embodiments, a method performed by a base station for determining precoding information includes: determining channel estimates for at least a channel between the wireless device and another device; determining a plurality of precoding hypotheses based on the channel estimates; determining a figure of merit for each of the plurality of precoding hypotheses; and determining the precoding information based on the figure of merit for each of the plurality of precoding hypotheses. In some embodiments, this precoding method enables the use of reciprocity-based precoding down to a lower Signal to Noise Ratio, SNR, than what existing state of the art reciprocity-based precoding can offer.

18 Claims, 14 Drawing Sheets

(56) References Cited

U.S. PATENT DOCUMENTS

| | | | |
|---|---|---|---|
| 2013/0039235 A1 | 2/2013 | Rahman et al. | |
| 2014/0307645 A1* | 10/2014 | Ji | H04L 5/0053 |
| | | | 370/329 |
| 2015/0092824 A1* | 4/2015 | Wicker, Jr. | H04L 25/0204 |
| | | | 375/224 |
| 2015/0381335 A1* | 12/2015 | Khojastepour | H04B 7/0456 |
| | | | 370/278 |
| 2016/0073370 A1* | 3/2016 | Axmon | H04W 56/0015 |
| | | | 370/350 |
| 2016/0219506 A1* | 7/2016 | Pratt | H04L 5/143 |
| 2017/0149591 A1* | 5/2017 | Manolakos | H04B 7/0619 |
| 2017/0264349 A1* | 9/2017 | Kant | H04B 7/0632 |
| 2019/0036578 A1* | 1/2019 | Zirwas | H04B 7/0469 |
| 2020/0373975 A1* | 11/2020 | Li | H04B 7/024 |
| 2023/0269779 A1* | 8/2023 | Babaei | H04W 74/0833 |
| | | | 370/329 |

OTHER PUBLICATIONS

International Search Report and Written Opinion for International Patent Application No. PCT/IB2019/059678, dated Mar. 17, 2020, 21 pages.

\* cited by examiner

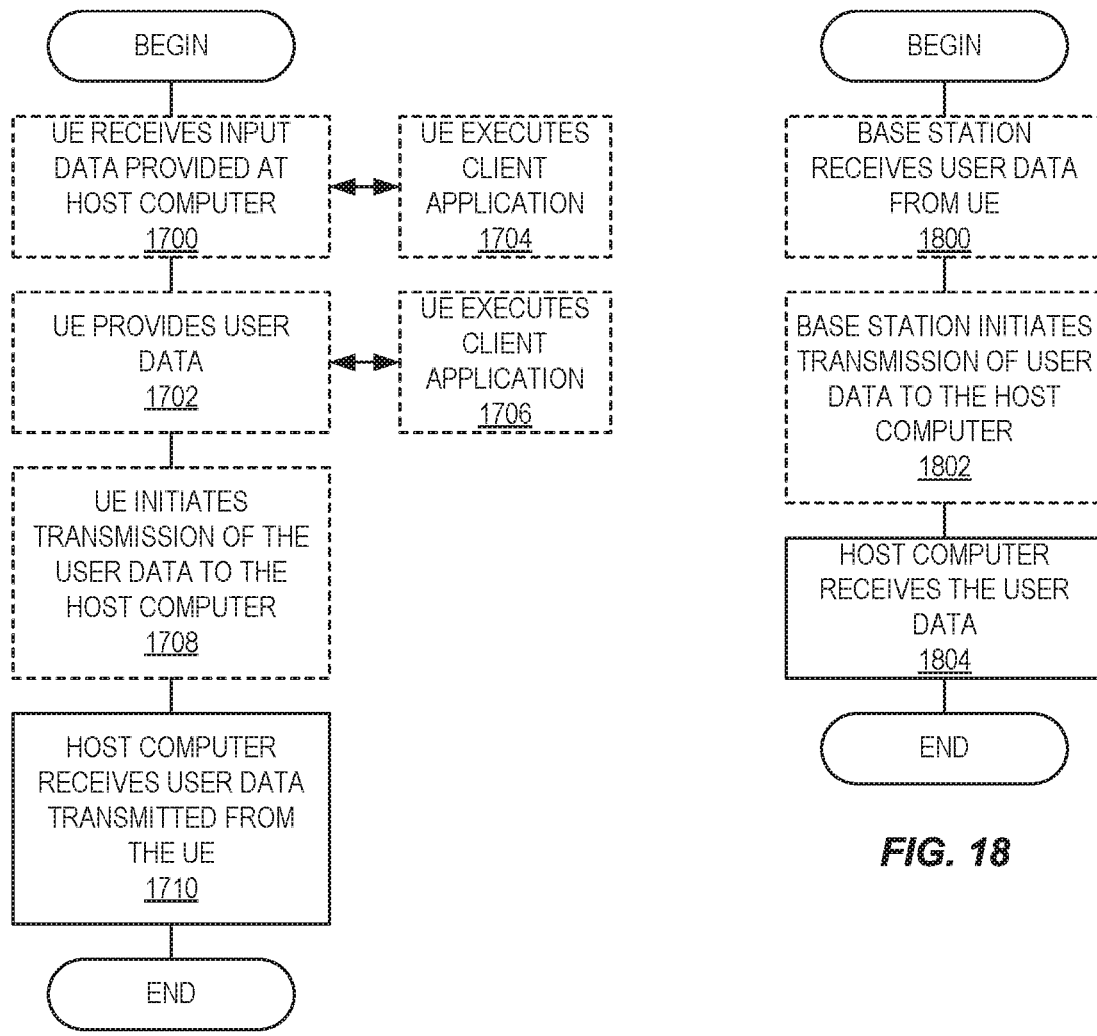

COVERAGE ENHANCED RECIPROCITY-BASED PRECODING SCHEME

RELATED APPLICATIONS

This application is a 35 U.S.C. § 371 national phase filing of International Application No. PCT/IB2019/059678, Nov. 11, 2019, which claims the benefit of provisional patent application Ser. No. 62/802,064, filed Feb. 6, 2019, the disclosures of which are hereby incorporated herein by reference in their entireties.

TECHNICAL FIELD

The current disclosure relates to determining precoding information.

BACKGROUND

Multiple-Input-Multiple-Output (MIMO) communication is a technique for serving several users simultaneously with the same time and frequency resource in a wireless communication network. This technique, in which a New Radio base station (gNB) and/or a User Equipment (UE) are equipped with multiple antennas, allows for spatial diversity to transmit data in both Uplink (UL) and Downlink (DL) directions. The obtained spatial diversity increases the capacity of the network dramatically, or equivalently one can say that it offers a more efficient utilization of the frequency spectrum. Moreover, MIMO can reduce the inter-cell and intra-cell interferences which in turn, leads to more frequency re-use. As the electromagnetic spectrum is a rare resource, MIMO is a vital solution for the extension of the capacity of wireless communication systems.

A key point for effective deployment of the MIMO communication technology is the access to estimate of the channel responses between the gNB and the users in the associated network cell, which is usually called Channel State Information (CSI). These channel responses include those in DL and UL transmissions and help to form the beam from the gNB toward the intended UEs. The channel in the UL direction is usually estimated using pilot symbols (reference signals) sent by the UEs and received by the gNB (often called "sounding" and, for example, implemented as Sounding Reference Symbols in 3GPP Long Term Evolution (LTE) and New Radio (NR)).

For a Time Division Duplexing (TDD)-based system, it is possible to apply the physical channel property of reciprocity and use the UL sounding and channel estimation to obtain the DL channel estimates as well. The DL channel estimates, consequently, can be used to calculate the weight for the beamforming. In fact, the reciprocity-based algorithms for beamforming in the downlink transmission are amongst the most successfully exploited algorithms in MIMO and are predicted to be widely exploited in the fifth generation of cellular wireless communication networks. This class of algorithms is applicable whenever the so-called channel reciprocity holds. More precisely, they assume that the channel responses in the uplink and downlink directions are the same up to a change in the role of the transmitter and receiver and disregarding output power differences. Using this fact, they use the estimated channel in the uplink direction for beamforming in the downlink. This principle holds, when time-division multiplexing is used for sharing data transmission time between the DL and UL transmissions. In summary, in a reciprocity-based beamforming, from the previously transmitted pilot symbols from the UEs to the gNB, the UL channels are estimated, and then these estimates will be valid in the DL direction by transposing the channel matrices.

Another way to obtain information about the channel between the gNB and UEs is to use information fed back by the UEs to the gNB. More specifically, in this method, the gNB and the UEs share a common set of precoding matrices which is usually referred to as the codebook. Then having this codebook and using the estimated channel in the UE side (based on DL reference signals), the UE selects the precoding matrix from the codebook that maximizes a Signal to Noise Ratio (SNR) at the UE when the data transmission is in the DL direction. Each UE feeds an index from the codebook back to the base station, and the base station uses this selected-by-UE precoder to transmit the data to the UE. In the current standards for 4G and 5G, there are some predesigned codebooks that can be used for this type of precoding. A common choice of such codebooks is based on a Grid of Beams (GoB), which is essentially a Discrete Fourier Transform (DFT) matrix. In a GoB codebook, each precoding element corresponds to a direction of the main-lobe (assuming a planar array with uniform element separation and low angular spread).

SUMMARY

Systems and methods for coverage enhanced reciprocity-based precoding schemes are provided. In some embodiments, a method performed by a base station for determining precoding information includes: determining channel estimates for at least a channel between the wireless device and another device; determining a plurality of precoding hypotheses based on the channel estimates; determining a Figure of Merit (FOM) for each of the plurality of precoding hypotheses; and determining the precoding information based on the figure of merit for each of the plurality of precoding hypotheses. In some embodiments, this precoding method enables the use of reciprocity-based precoding down to a lower Signal to Noise Ratio (SNR) than what existing state of the art reciprocity-based precoding can offer.

In some embodiments, the method includes performing matched filtering of received reference symbols and corresponding known reference symbols; filtering an output of the matched filtering based on a plurality of precoding hypotheses; applying a transform to the filtered output for the plurality of precoding hypotheses to produce a plurality of transformed precoding hypotheses; calculating a figure of merit for each of the plurality of transformed precoding hypotheses; and selecting a precoder that maximizes the figure of merit as the precoding information.

In some embodiments, the matched filtering is performed with at least one of the group consisting of: a Sounding Reference Signal (SRS), a Random Access Channel (RACH), Demodulation Reference Signals (DMRS), a Channel State Information Reference Signal (CSI-RS), Physical Uplink Control Channel (PUCCH), and DMRS for PUCCH. In some embodiments, the matched filtering is performed with SRS and a Zadoff-Chu sequence inverted.

In some embodiments, the plurality of precoding hypotheses is chosen from at least one of the group consisting of: a codebook, a Grid of Beams (GoB), codebook a New Radio (NR) Type 1 codebook, an NR Type 2 codebook, and a subset of any of these codebooks.

In some embodiments, the transform is chosen from the group consisting of: a Discrete Fourier Transform (DFT), an Inverse DFT, a Discrete Cosine Transform (DCT), and an Inverse DCT.

In some embodiments, the transform is linear. In some embodiments, the FOM is a maximum. In some embodiments, the maximum is only performed over a limited range. In some embodiments, the limited range is related to at least one of the group consisting of: a cyclic prefix and a delay spread of the channel.

In some embodiments, the figure of merit is proportional to an estimated SNR.

In some embodiments, the wireless device operates in a NR communication network. In some embodiments, the base station is a gNB.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 16-18 are flowcharts illustrating methods implemented in a communication system according to some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
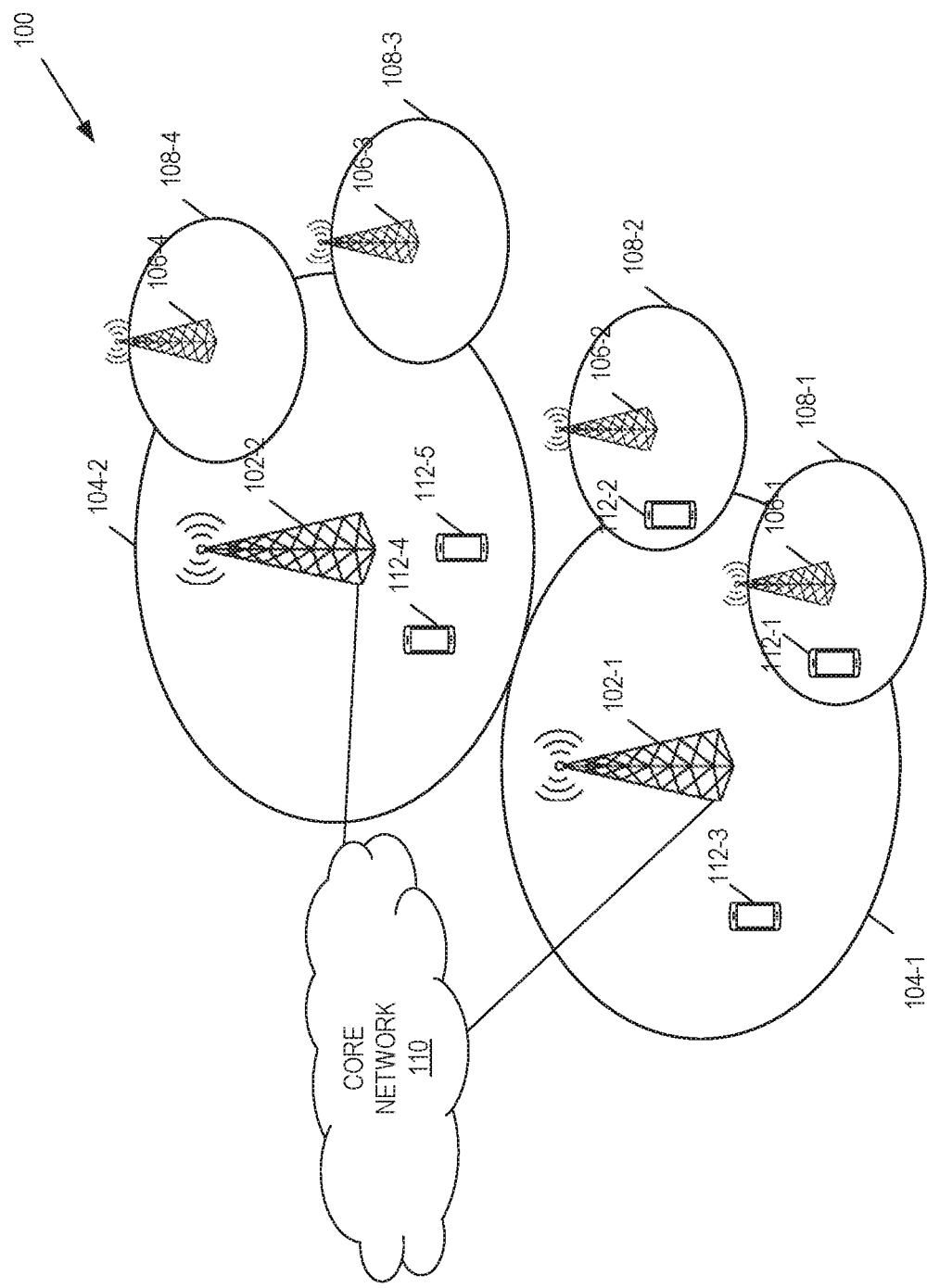
FIG. 1 illustrates one example of a cellular communications network, according to some embodiments of the present disclosure.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

There currently exist certain challenges. Numerous studies have shown that the current reciprocity-based precoding approaches show a poor performance for cell-edge UEs. In fact, due to this poor cell-edge performance, a smaller number of UEs are served with reciprocity-based precoding implying that the coverage of the reciprocity-based precoding with legacy algorithms is worse than the feedback-based precoding.

This coverage problem can be traced back to the UL channel estimates obtained from (typically) the Sounding Reference Signal (SRS). The UL transmit power is several orders of magnitude lower than the gNB transmit power. Hence, the SNR measured by the UL receiver (on the SRS) is lower than the DL SNR on the channel on which the (e.g., SRS based) precoder is applied. This means that the accuracy of the precoder (which is limited by the UL channel estimates, and hence UL SNR) may become unacceptable even in a channel condition where the DL signal quality is still satisfactory. As such, systems and methods for determining improved precoding information are needed.

Certain aspects of the present disclosure and their embodiments may provide solutions to the aforementioned or other challenges. Some embodiments disclosed herein propose a new precoding scheme outperforming the state-of-the-art reciprocity-based precoding methods in coverage limited scenarios (or more generally in scenarios with low UL SNR). This has been achieved by leveraging the fact that the main reason for the poor performance of reciprocity-based beamforming is the channel estimation limitation. Numerical simulations presented herein confirm this and further show that the previous channel estimation algorithm fails at a SNR much higher than the precoding method proposed herein does.

The proposed precoding method, which will be described in detail in the rest of the text, relies on the raw channel estimates that are the output of Matched Filtering (MF) to calculate the precoding weights. The raw estimates are then linearly processed to concentrate energy in both spatial domain (precoder or beam space) and in temporal domain. After this energy concentration step, a selection scheme based on the strongest tap of the channel is used to find the best beam. In some embodiments, the strongest tap is the one with the highest amplitude or squared amplitude. This enables finding better precoding weights at low SNR where the channel estimation algorithm, performed after the MF per UL RX antenna in the processing chain, fails to accurately "zoom in" on the channel.

Some embodiments disclosed herein allow to:
Test a set of precoders (from a codebook) against the received UL reference signal (which may be the SRS but could also be another), select the best, given a figure of merit, and then apply that precoder in the downlink
To use two linear transformations to concentrate energy in time and space before computing a scalar figure of merit per beam (precoder) hypothesis
To compute the figure of merit using the maximum of the per beam Power Delay Profile (PDP), or (more general) computing the power in a short interval of the PDP (short interval may be taken as smaller than cyclic prefix duration)

There are, proposed herein, various embodiments which address one or more of the issues disclosed herein. In some embodiments, a method is performed by a base station for determining precoding information. The method includes determining channel estimates for at least a channel between the base station and another device; determining a plurality of precoding hypotheses based on the channel estimates; determining a figure of merit for each of the plurality of precoding hypotheses; and determining precoding information based on the figure of merit for each of the plurality of precoding hypotheses.

In some embodiments, the method includes performing matched filtering of received reference symbols and corresponding known reference symbols; filtering an output of the matched filtering based on a plurality of precoding hypotheses; applying a transform to the filtered output for the plurality of precoding hypotheses to produce a plurality of transformed precoding hypotheses; calculating a figure of merit for each of the plurality of transformed precoding hypotheses; and selecting a precoder that maximizes the figure of merit as the precoding information.

In some embodiments, the matched filtering is performed with at least one of the group consisting of: SRS, RACH, and DMRS. In some embodiments, the matched filtering is performed with SRS and a Zadoff-Chu sequence inverted.

In some embodiments, the plurality of precoding hypotheses are chosen from at least one of the group consisting of: a codebook, a Grid of Beams codebook, an NR Type 1 codebook, an NR Type 2 codebook, and a subset of any of these codebooks.

In some embodiments, the transform is chosen from the group consisting of: a Discrete Fourier Transform, DFT, an Inverse DFT, a Discrete Cosine Transform, DCT, and an Inverse DCT. In some embodiments, the transform is linear.

In some embodiments, the figure of merit is a maximum. In some embodiments, the maximum is only performed over a limited range. In some embodiments, the limited range is related to at least one of the group consisting of: a cyclic prefix and a delay spread of the channel. In some embodiments, the figure of merit is proportional to an estimated SNR.

In some embodiments, the base station operates in a New Radio (NR) communication network. In some embodiments, the base station is a gNB.

Certain embodiments may provide one or more of the following technical advantage(s). Leveraging the prior-knowledge that channel energy is confined in both space (due to limited angular spread) and time (due to limited delay-spread) and selecting a wideband precoder capturing only coarse beam directions allows some embodiments disclosed herein to outperform legacy methods at low SNR. Therefore, in some embodiments disclosed herein, the proposed precoding method enables the use of reciprocity-based precoding down to a SNR lower than what existing state of the art reciprocity-based precoding can offer. Some embodiments might provide one or more of the following advantages:

- Increased DL SNR especially for weak UEs due to a more effective DL beamforming when compared to legacy reciprocity-based algorithms. A consequence of this would be a higher throughput for the weak UEs.
- Network coverage improvement due to a decrease in the required UL SNR to be served by the gNB with reciprocity-based precoding.
- Added flexibility in precoding schemes: this method may be more compatible with Multiple User MIMO than CSI feedback-based schemes (which is the current state-of-the art for UEs with no coverage using the known algorithms), as the codebook of beams is not limited to the standardized codebook and to selecting a single strongest beam.
- Less complex Radio Resource Control configuration machinery—UEs falling out of current coherent reciprocity-based precoding coverage can still be served without configuring extra CSI reports, or reconfiguring users when they fall out of coverage.
- Compared to other schemes for precoder selection based on reciprocity, the proposed scheme can have equal performance with a smaller SRS resource.
- There is potential for use with other UL signals, e.g., Physical Uplink Shared Channel DMRS, and random-access preambles. This may be very valuable if traffic bursts are short.

In the current reciprocity-based precoding methods implemented in different simulation tools, the output of the MF, which contains the quotient between the received reference symbols and the corresponding known reference symbols, is used to estimate the channel response employing a discrete cosine transform as well as an Akaike Information Criterion (AIC) criterion to separate the signal-dominated from the noise-dominated channel taps (Note that the quotient is conceptually at the output of the MF; implementations typically do not do explicit division). The numerical simulations show that this implementation of the channel estimation requires fairly high per-element SNR to work; −15 dB is a good rule-of-thumb. This then would be a barrier for the performance of any reciprocity-based precoding method as this kind of precoding needs a fairly accurate channel estimate to form the beams in the right directions.

An aspect of some embodiments disclosed herein is to use the output of the MF and combine with some beam selection step to obtain the precoding weights. More specifically, in some embodiments, the PDP (absolute square of Fast Fourier Transform (FFT)/Inverse Fast Fourier Transform (IFFT) of the signal) of the output of MF shows a delay profile of the channel at each comb where the peak in this profile is associated to the delay for the strongest path from a UE to the gNB. This strongest path, on the other hand, is associated to the main direction where the most of energy is received from the UE by the gNB. Another way of expressing this is that there is prior knowledge that the channel energy is contained in relatively few taps temporally, and that the energy is concentrated in relatively low dimensional subspace spatially.

Now, consider a codebook, whose elements are spanning the relevant subspace/sector in both elevation and azimuth domains with some angular resolution. Moreover, consider that the output of the MF is available per each antenna pair (or more precisely for each SRS-port to gNB RX antenna link). The proposed solution uses spatial precoding (with hypothesis testing over all precoders in a codebook) combined with a transform that concentrates channel energy to few coefficients; this is the energy concentration part. The selected precoder is the one that maximizes a figure of metric measured after the combination of this energy concentration step.

Denoted by $x(k)_T^c$—the received signal at subcarrier index k, gNB rx antenna r, comb (which should be seen in a general setting as an orthogonal in time and frequency RS resource) c.

Figure 2:
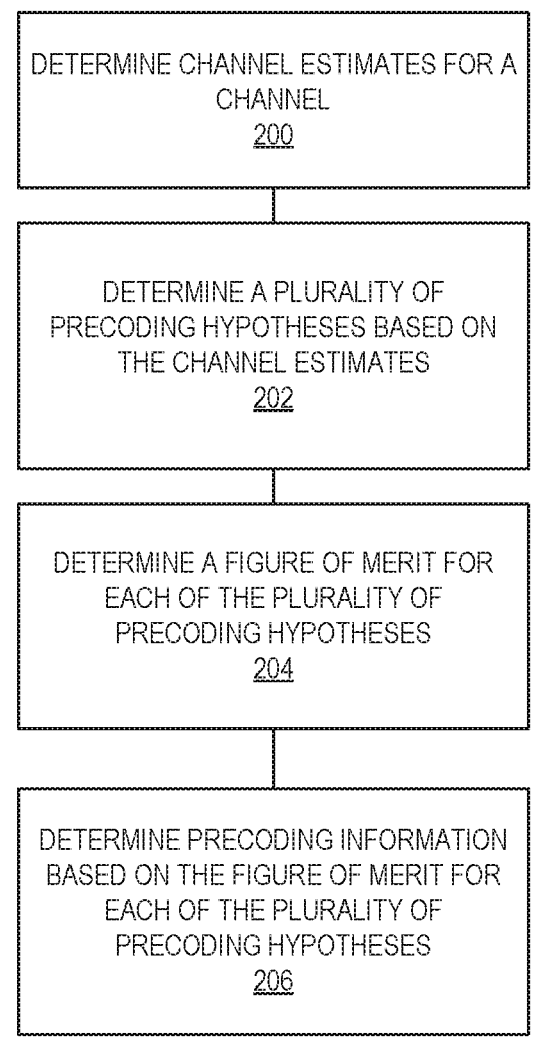
FIG. 2 illustrates a method of operating a node such as a base station for determining precoding information, according to some embodiments of the present disclosure.

FIG. 2 illustrates a method of operating a node such as a base station for determining precoding information. The node determines channel estimates for a channel such as the channel between a wireless device and a base station (step 200). Then, the node determines a plurality of precoding hypotheses based on the channel estimates (step 202). A Figure of Merit (FOM) is determined for each of the precoding hypotheses (step 204) and the precoding information to be used is determined based on the FOM for the precoding hypotheses (step 206). In some embodiments, this node is a base station. In some embodiments, this node is a wireless device. In some embodiments, the wireless device uses this for CSI-RS. In some embodiments, instead of measuring one signal per receive antenna as is sometimes done on the base station side, the wireless device would measure one signal per CSI-RS antenna port. In this case, the codebook is typically one of the standardized codebooks.

Figure 3:
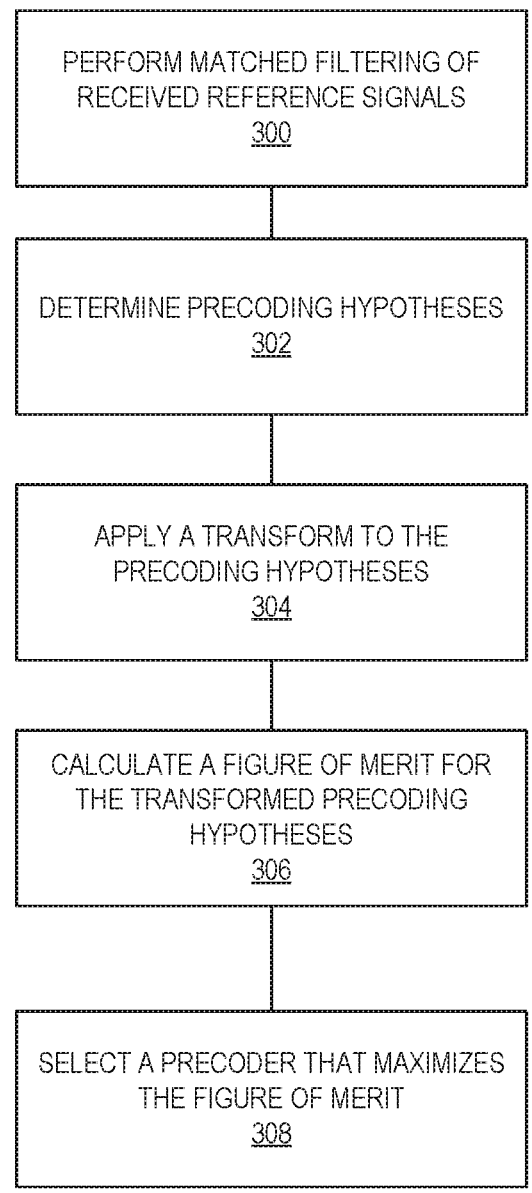
FIG. 3 illustrates additional details for operating the node for determining precoding information, according to some embodiments of the present disclosure.

FIG. 3 illustrates another embodiment for determining precoding information. Matched filtering is performed (step 300). In some embodiments, this is based on SRS, RACH, and/or DMRS. For example, $m(k)_r^p = s(k)^p \times x(k)_r^{c(p)}$—signal for port p after matched filter, $s(k)^p$ is inverse of reference signal sequence for port p. In the SRS case, this is a Zadoff-Chu sequence inverted. In some embodiments, the inversion is a conjugation. In some embodiments, step 300 is a more detailed version of step 200 discussed above.

Precoding (for all hypotheses) is performed (step 302). In some embodiments, this is one output per hypothesis (in codebook). The precoder may be wideband and subband can also be considered. The codebook can be proprietary, or matching standard (no standardization needed). A Grid of Beams (GoB) is one example. For instance, $pm(k)_{hyp}^p = \Sigma_r p_{hyp}^r \times m(k)_r^p$—precoded stream for precoder hypothesis hyp ($p_{hyp}^r$ is the complex precoder weight for antenna r given hypothesis hyp). In some embodiments, the precoder hypotheses are selected from a codebook that may be a grid-of-beam but may also be something arbitrary. The codebook may be that of the NR standard (type 1 or type 2), but it can also be different (no standardization required).

Applying a transform is performed (step 304). In some embodiments, this transform is FFT/DFT or IFFT/IDFT. Other options are possible. In some embodiments, only the Power Delay Profile (PDP) is of interest (power per tap). For instance, $PM(K)_{hyp}^p = (I)DFT(pm(k)_{hyp}^p)$—computes DFT over k (can also be IDFT). The transform used is typically a (I)DFT but it is possible to use, e.g., a DCT. If the transform is linear, this step and the previous can be taken in any order.

A FOM is computed (step 306). In some embodiments, there is one FOM per hypothesis. In some embodiments, the FOM is a max over interval of PDP. In some embodiments it is an SNR estimate (max over median). In some embodiments, a sliding window is used. For instance, $FOM_{hyp}^P=\max_{K\ In\ range}|PM(K)_{hyp}^P|$—computes FOM (can be multiple embodiments). The exemplified FOM is max, but variant exists. Typically, the maximization is only performed over a limited range of K of the full PM(K). In some embodiments, this limited range is a limited set of samples (taps) in the transform domain. One way of selecting the range is to relate it to the cyclic prefix or the delay spread of the channel. Another embodiment of the FOM could be:

$$FOM_{hyp}^p = \frac{\max_{K=range}|PM(K)_{hyp}^p|^2}{\text{median}|PM(K)_{hyp}^p|^2},$$

which is proportional to an estimated SNR.

A precoder is selected that maximizes FOM (step 308). In some embodiments, only one precoder is selected, but in some embodiments, multiple may also be useful. For example, for spatial compatibility with other users or if used for de-noising before another precoder selection method. For instance, PMI=arg $\max_{hyp}(FOM_{hyp}^P)$—select hypothesis with best FOM.

Note that in some embodiments, steps 302 and 304 may be interchanged (IDFT/DFT can be done over RX antennas prior to precoding).

In this fashion, the embodiments disclosed herein are no longer confined to the channel estimator's sensitivity to the UL SNR, meaning that the proposed methods can work well down to an SNR lower than other reciprocity-based precoding methods that are relying on the channel estimation method.

To show the effectiveness of some embodiments of the proposed precoding scheme, a number of numerical simulations were performed in the simulator that implements link-level simulations. In the first set-up, a Tap-Delay-Line (TDL) channel model is used with 8 and 16 antennas in gNB and 2 antennas in UE side. The channel model has a high level of spatial correlation and a delay spread of 300 ns at 3.5 GHz. To compare the performance of the precoding algorithms, the metric of precoding's SNR loss is used. More precisely, this precoding loss denotes the loss that a practical precoder would have in comparison to a precoder that knows the true channel (sometimes referred to as an oracle), as a function of uplink SNR. Mathematically speaking, the precoding loss is defined as $$PL = \frac{\sum_f \|H_f \hat{W}_f\|_F^2}{\sum_f \|H_f W_f\|_F^2}$$

where $H_f$ denotes the DL-direction true channel response at SC f, $\hat{H}_f$ represents the DL-direction estimated channel at SC f, $W_f$ shows the precoder matrix obtained by the method that knows the true channels, and $\hat{W}_f$ represents the precoder matrix given by a practical method that its performance is under evaluation.

Although the choice of the codebook is arbitrary in the proposed precoding method, for the sake of ease of comparison, an NR-standardized codebook is used in the examples disclosed herein. The same codebook is used to implement the reci-GoB precoding algorithm. The reci-GoB method resembles the Grid of Beams (GoB) algorithm (which is typically based on measurements on the downlink CSI-RS and feedback from the UE on the uplink) by computing the received SNR at the UE, for each precoder in a given codebook. This implies that the reci-GoB is also a reciprocity-based precoding algorithm. The next precoder in this comparison is the Minimum Mean Square Error-based precoding which is denoted here as the Reciprocity Assisted Transmission algorithm.

It is expected that CSI-feedback-based precoding using Type 1 codebook (GoB) will perform similar to the proposed algorithms for high SNR, but the low SNR performance is dependent on UL feedback signal coverage (performance does not degrade with decreasing SNR as long as there is coverage). It is likely that the UL coverage breaks at a higher SNR point than the point where the proposed scheme fails.

Figure 4:
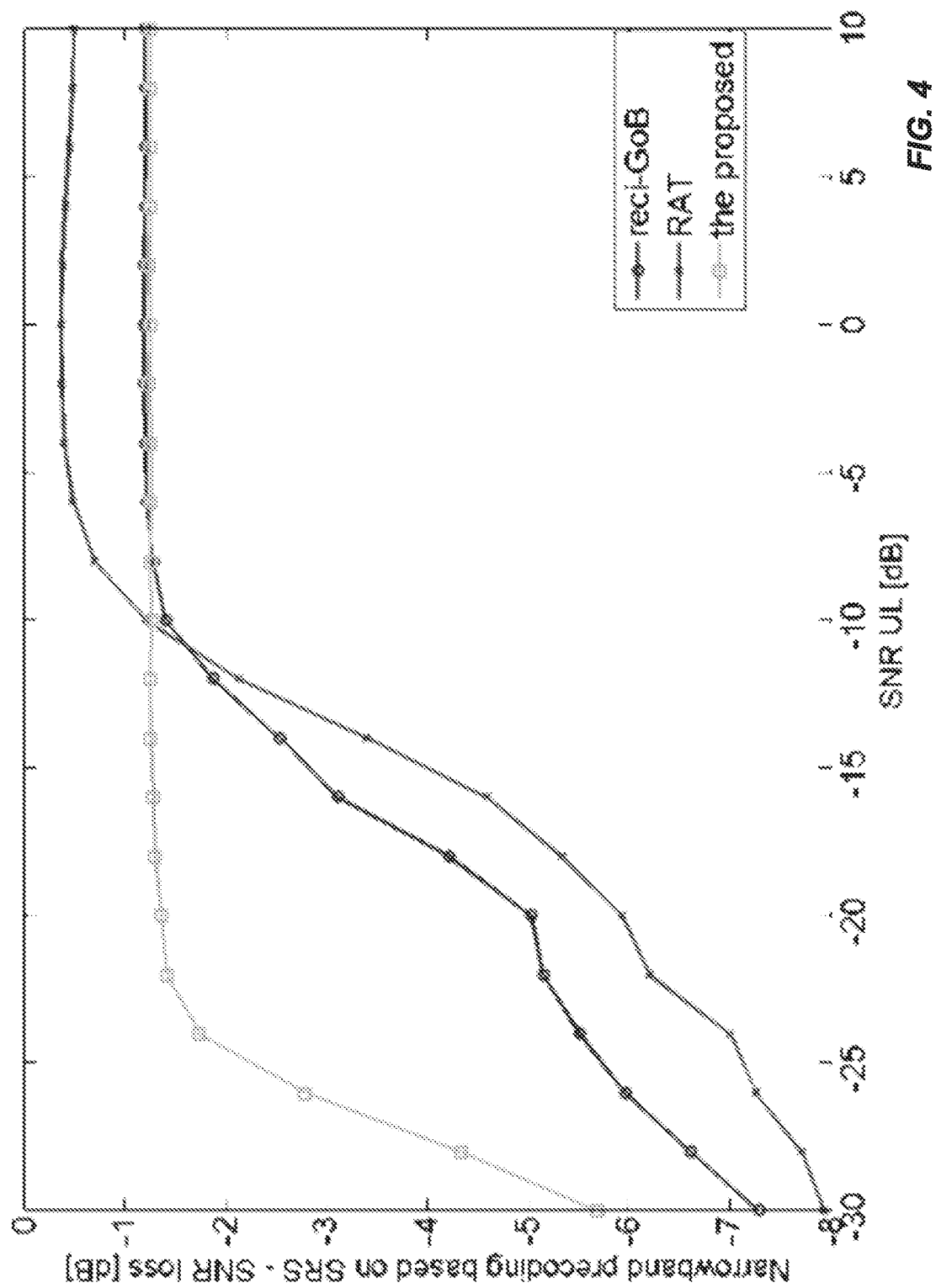
FIG. 4 shows a comparison between precoding methods with a Tap-Delay-Line (TDL) channel model and eight antennas at the base station, according to some embodiments of the present disclosure.
Figure 5:
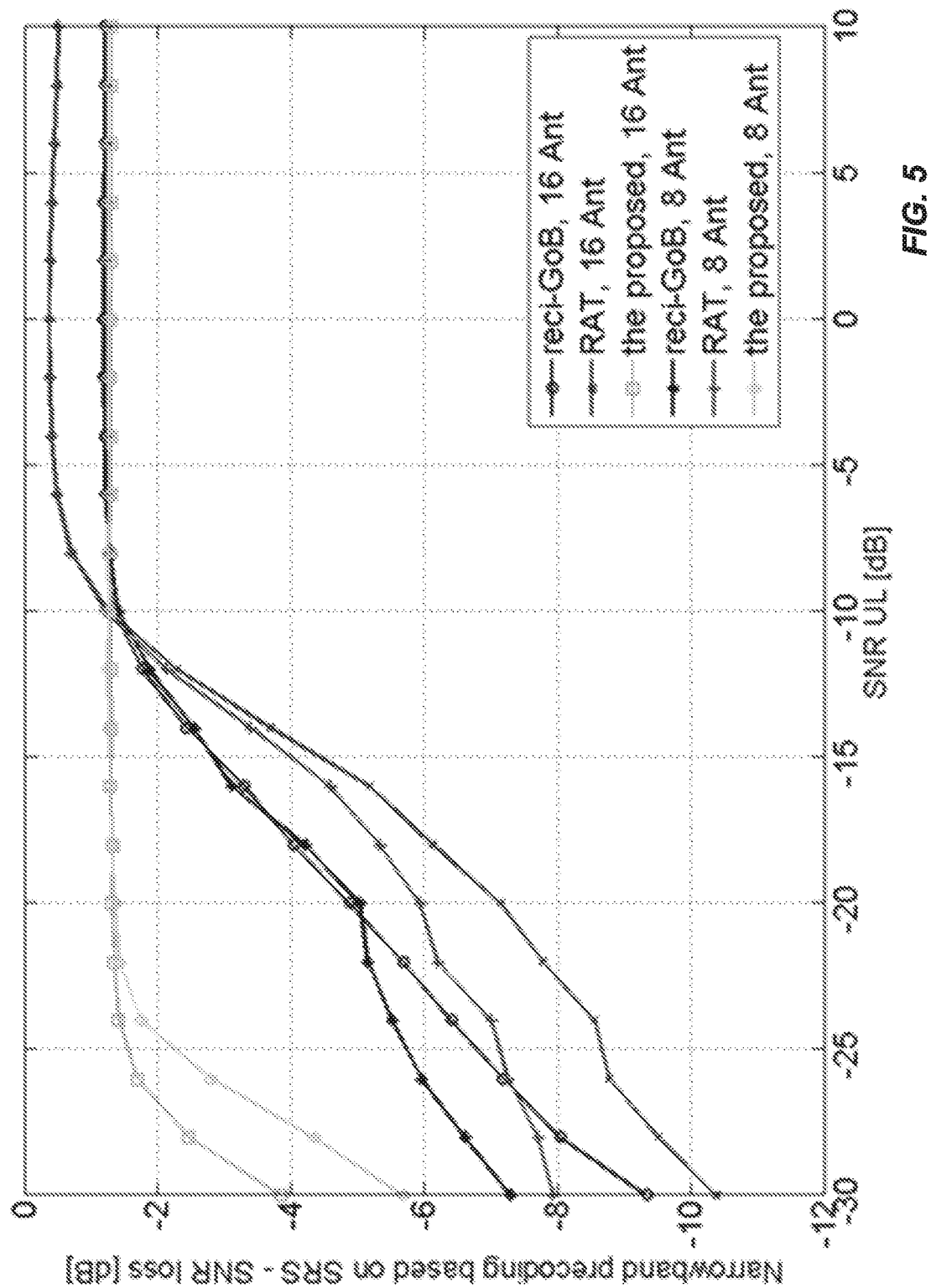
FIG. 5 shows a comparison between precoding methods with a TDL channel model and eight and sixteen antennas at the base station, according to some embodiments of the present disclosure.

FIG. 4 shows a comparison between precoding methods with TDL channel model and 8 antennas at gNB. FIG. 4 shows the results of the simulation when there are 8 antennas in the gNB. As shown, the proposed method fundamentally shifts the operating region of the beamforming to significantly lower SNRs. Particularly, if one can accept a 2 dB drop in the precoding loss (note that 2 dB is arbitrary herein), then with the proposed method, it is possible to work down to −25 dB UL SNR, while the best can go down to −13 dB. This gap increases when the number of antennas increases, as shown in FIG. 5 which shows a comparison between precoding methods with TDL channel model and 8 & 16 antennas at gNB. This is, in fact, in line with what is expected from multiple-antenna transmission where it may be possible to coherently add all the received signals from different antennas. As can be seen in FIG. 5, the performance of the proposed method improves with the increase in the number of transmit antennas while the performance of others gets slightly worse at low SNR.

Figure 6:
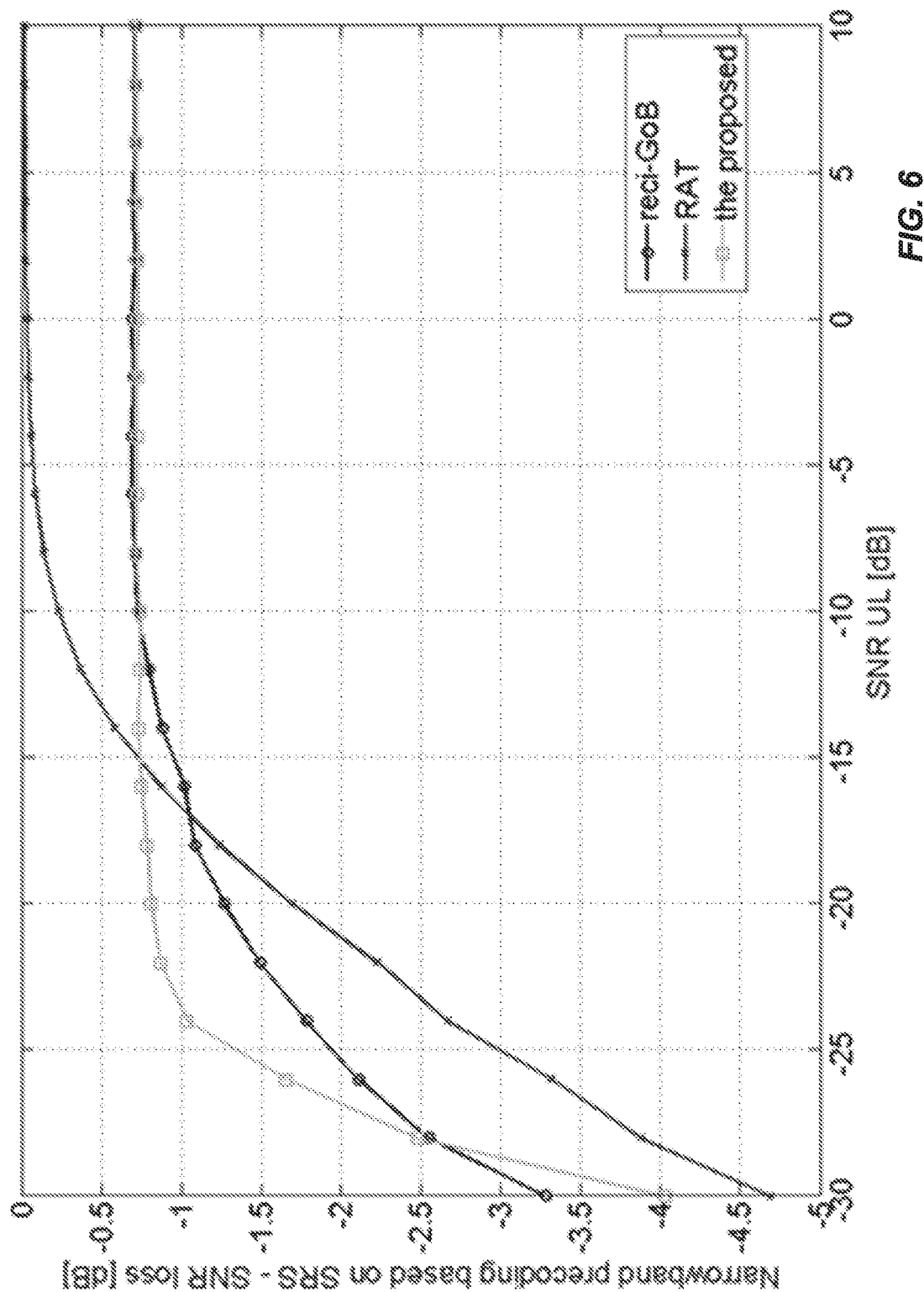
FIG. 6 shows a comparison between precoding methods with a Cluster-Delay-Line (CDL) channel model where the performance curves are plotted when the number of transmit antennas equals eight, according to some embodiments of the present disclosure.
Figure 7:
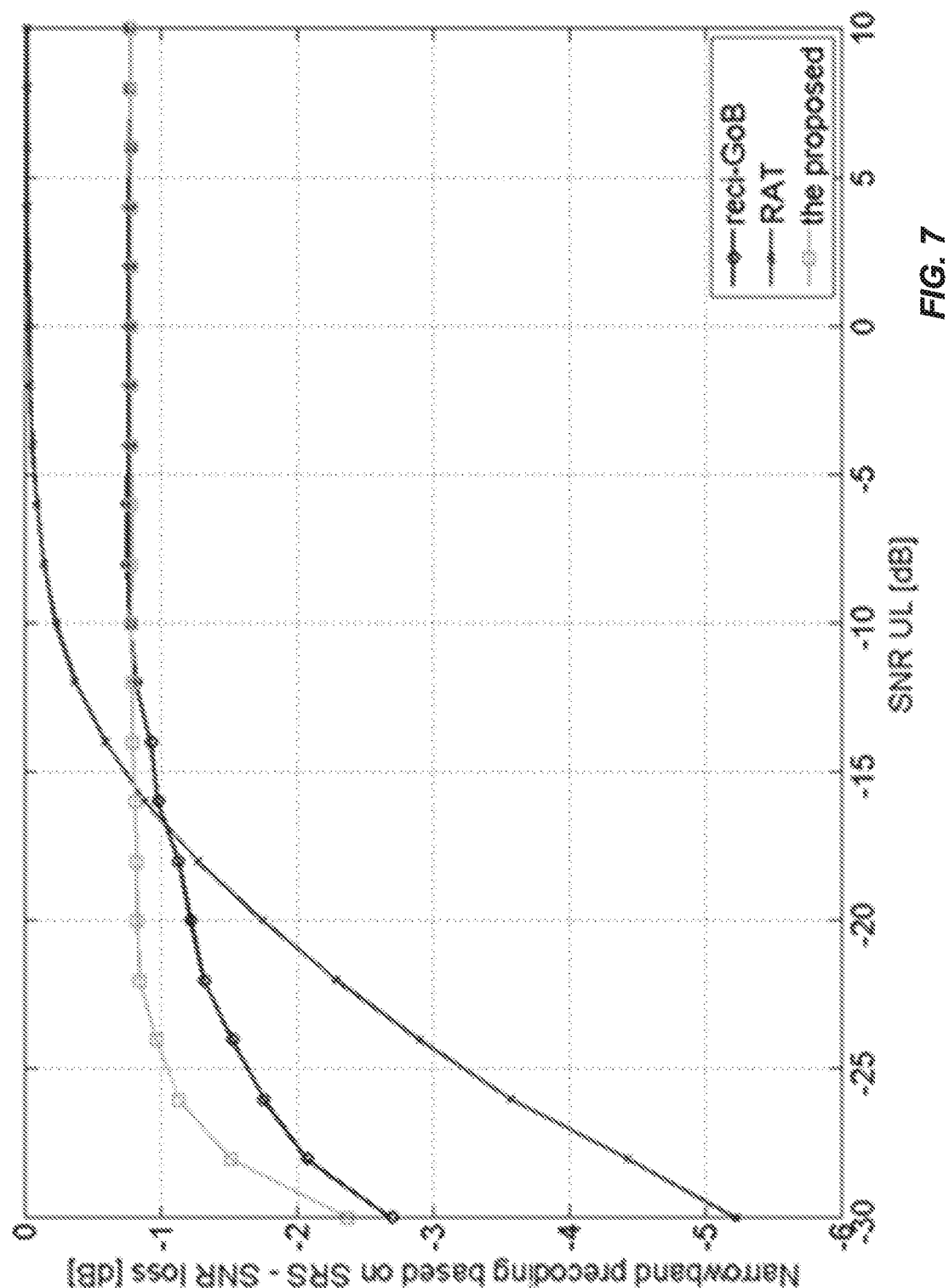
FIG. 7 shows a comparison between precoding methods with a CDL channel model with the same settings as in FIG. 6 except for having sixteen antennas at the transmit side, according to some embodiments of the present disclosure.

In the next set of simulations, the Cluster-Delay-Line (CDL) channel model is used with delay spread of 300 ns and angular spread of 15 degrees in azimuth. FIG. 6 shows a comparison between precoding methods with the CDL channel model and 8 antennas at gNB. In FIG. 6, the performance curves are plotted when the number of transmit antennas equals 8. Although the improvement is not as dramatic as in the case of having TDL channel model, the improvement at low SNR is still very promising. FIG. 7 shows a comparison between precoding methods with the CDL channel model and 16 antennas at gNB. FIG. 7 also shows the results of the simulations with the same settings as in FIG. 6 except for having 16 antennas at the transmit side.

Figure 8:
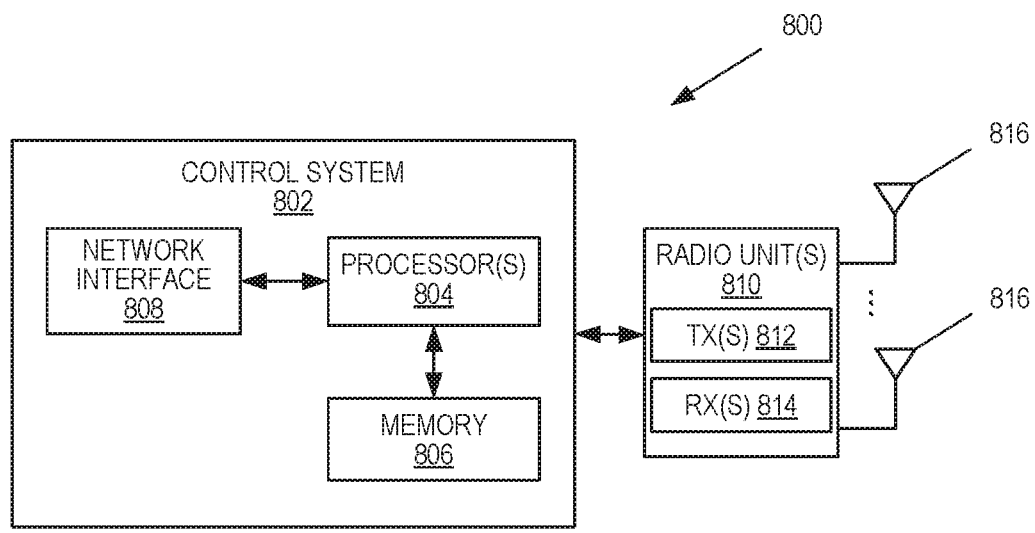
FIG. 8 is a schematic block diagram of a radio access node according to some embodiments of the present disclosure.

FIG. 8 is a schematic block diagram of a radio access node 800 according to some embodiments of the present disclosure. The radio access node 800 may be, for example, a base station 102 or 106. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
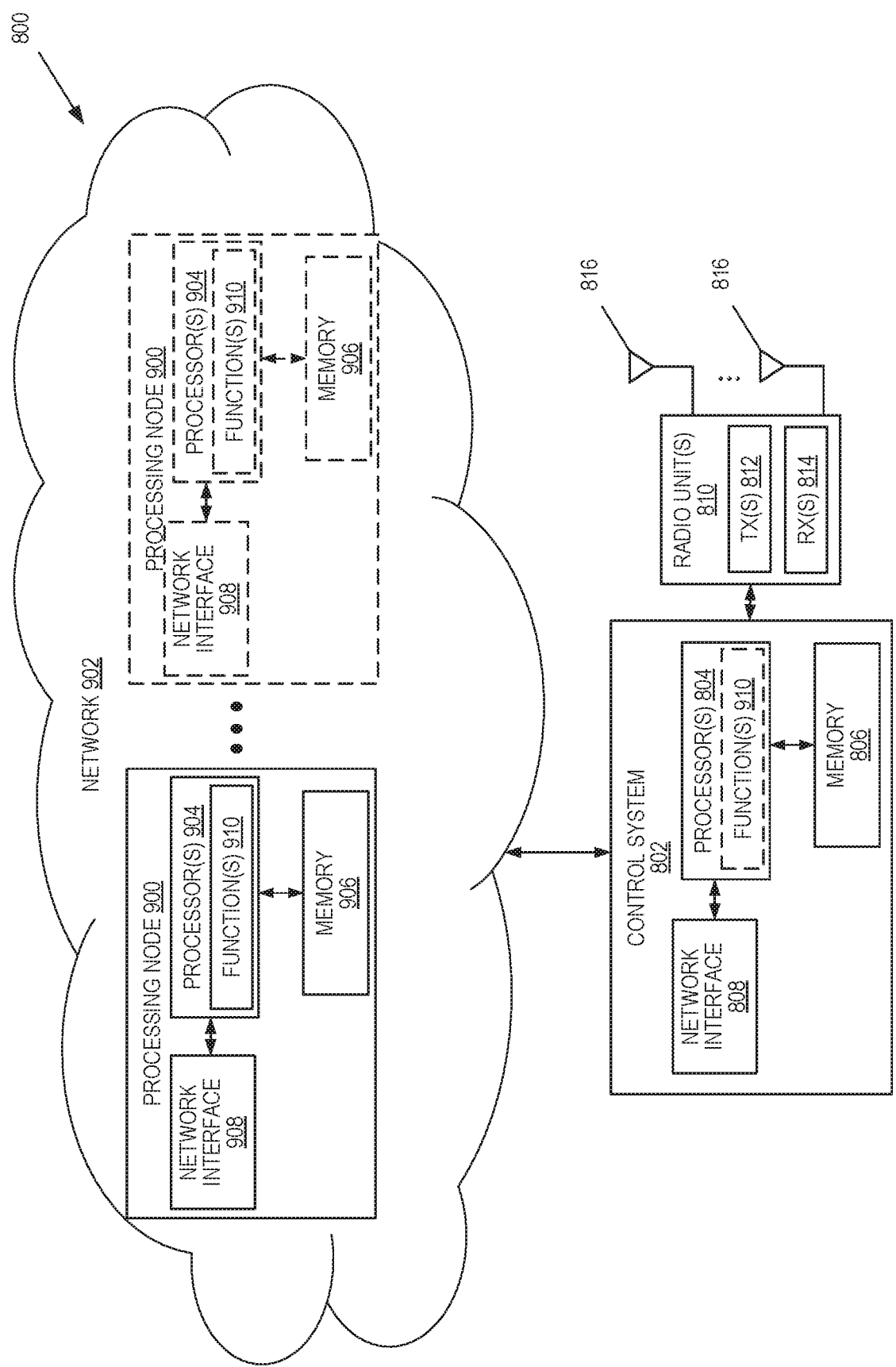
FIG. 9 is a schematic block diagram that illustrates a virtualized embodiment of the radio access node according to some embodiments of the present disclosure.

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes the control system 802 that includes the one or more processors 804 (e.g., CPUs, ASICs, FPGAs, and/or the like), the memory 806, and the network interface 808 and the one or more radio units 810 that each includes the one or more transmitters 812 and the one or more receivers 814 coupled to the one or more antennas 816, as described above. The control system 802 is connected to the radio unit(s) 810 via, for example, an optical cable or the like. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
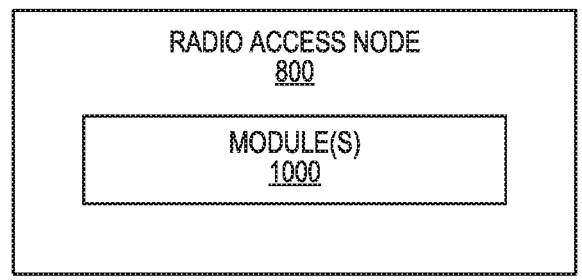
FIG. 10 is a schematic block diagram of the radio access node according to some other embodiments of the present disclosure.

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
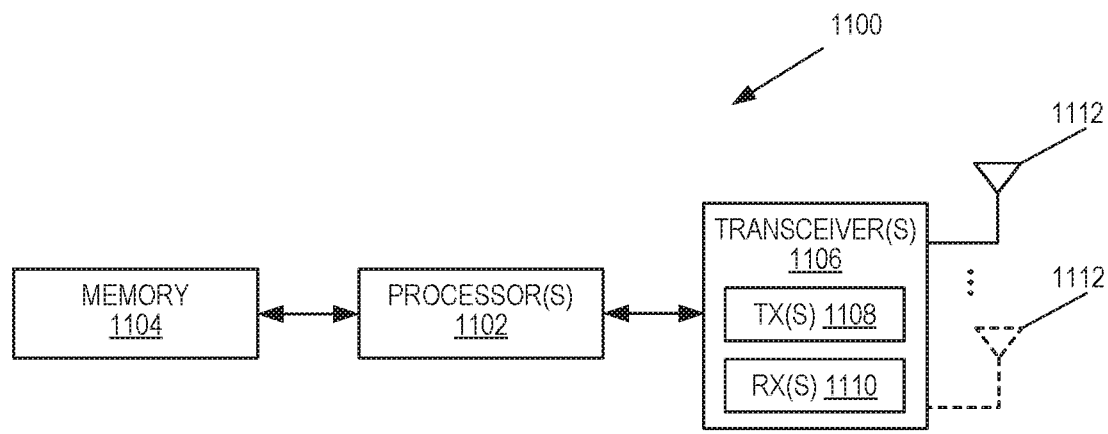
FIG. 11 is a schematic block diagram of a UE according to some embodiments of the present disclosure.

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the UE 1100 described above may be fully or partially implemented in software that is, e.g., stored in the memory 1104 and executed by the processor(s) 1102. Note that the UE 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the UE 1100 and/or allowing output of information from the UE 1100), a power supply (e.g., a battery and associated power circuitry), etc.

In some embodiments, a computer program including instructions which, when executed by at least one processor, causes the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
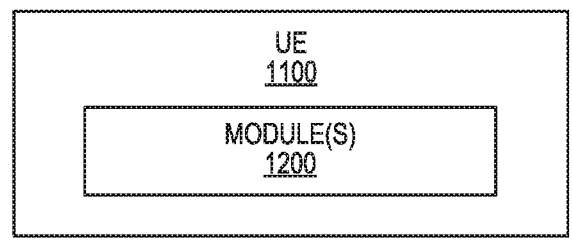
FIG. 12 is a schematic block diagram of the UE according to some other embodiments of the present disclosure.

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein.

Figure 13:
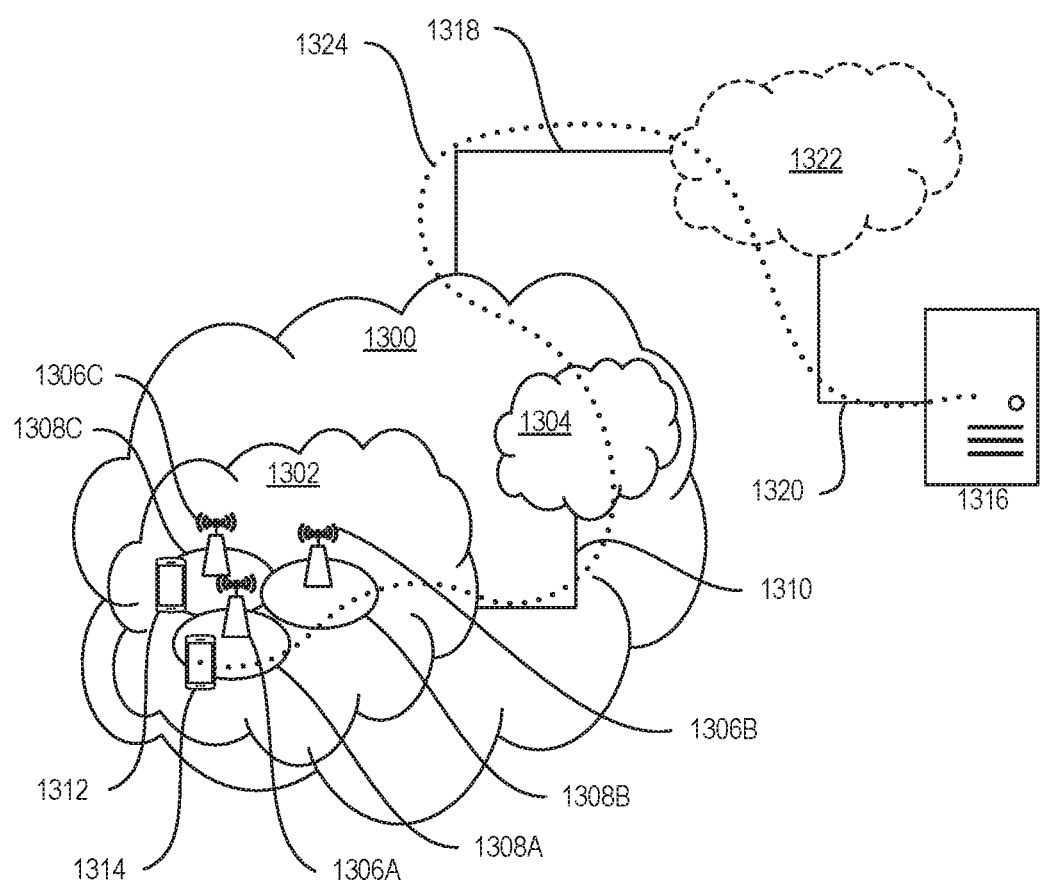
FIG. 13 illustrates a communication system including a telecommunication network, such as a 3GPP-type cellular network according to some embodiments of the present disclosure.

With reference to FIG. 13, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as NBs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloudimplemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
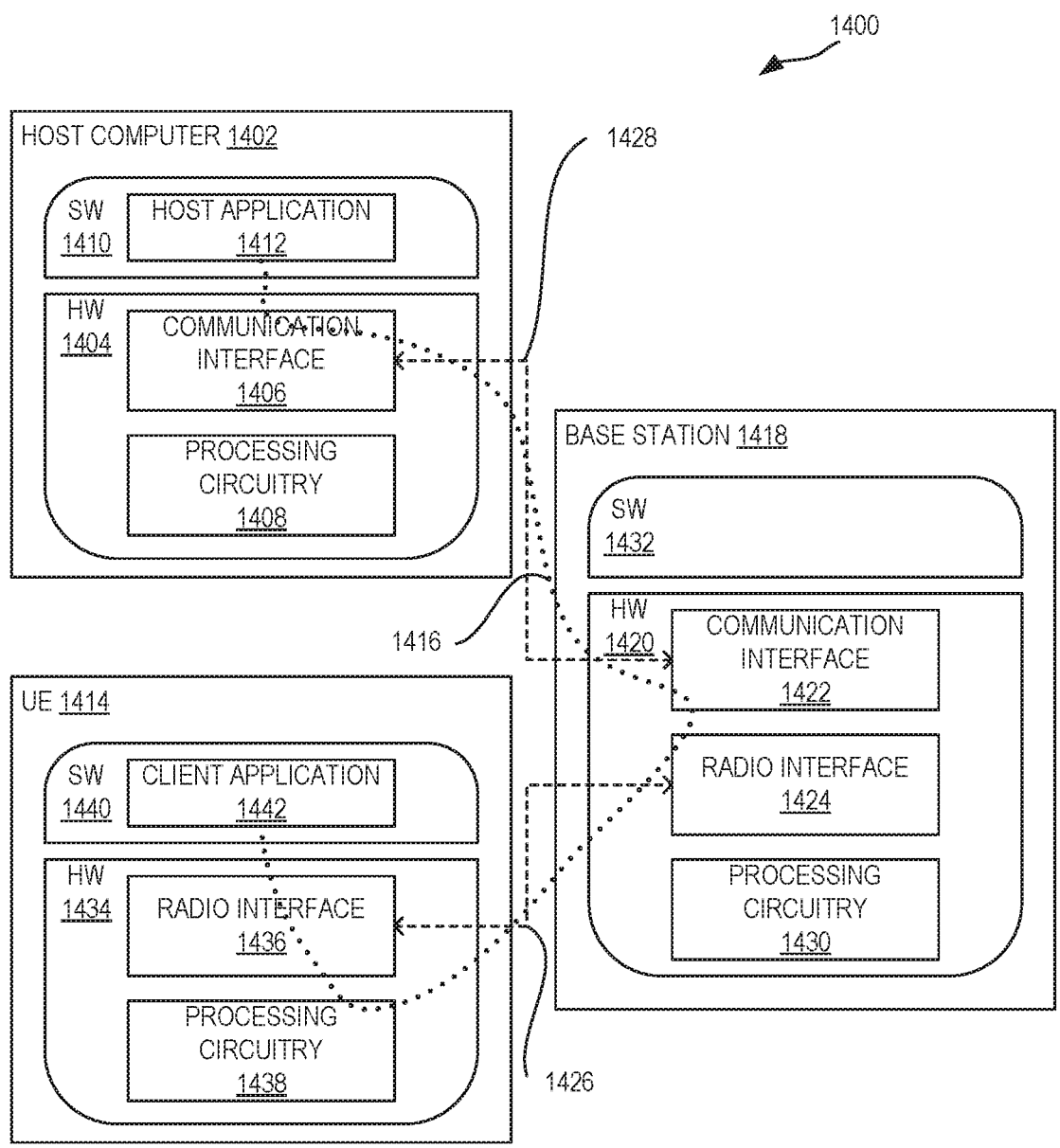
FIG. 14 illustrates a communication system including a host computer, according to some embodiments of the present disclosure.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment. More precisely, the teachings of these embodiments may improve the e.g., data rate, latency, power consumption, range and thereby provide benefits such as e.g., reduced user waiting time, relaxed restriction on file size, better responsiveness, extended battery lifetime, and more connectivity.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

Figure 15:
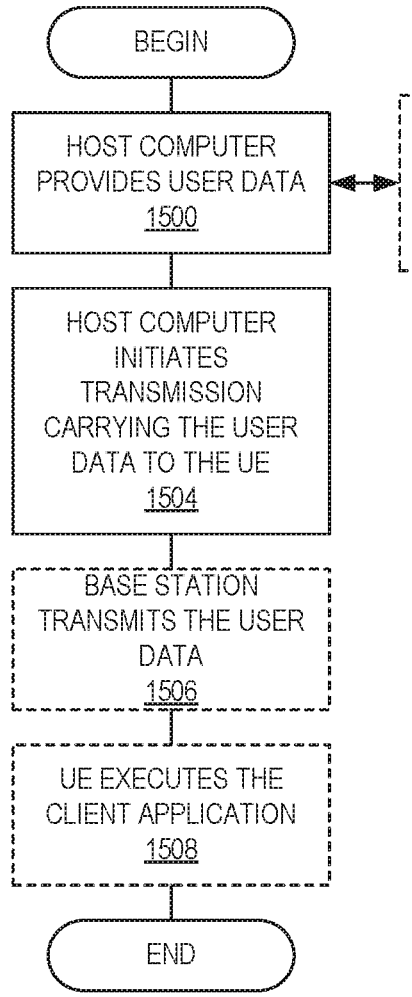
FIG. 15 is a flowchart illustrating a method implemented in a communication system according to some embodiments of the present disclosure.

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

Figure 16:
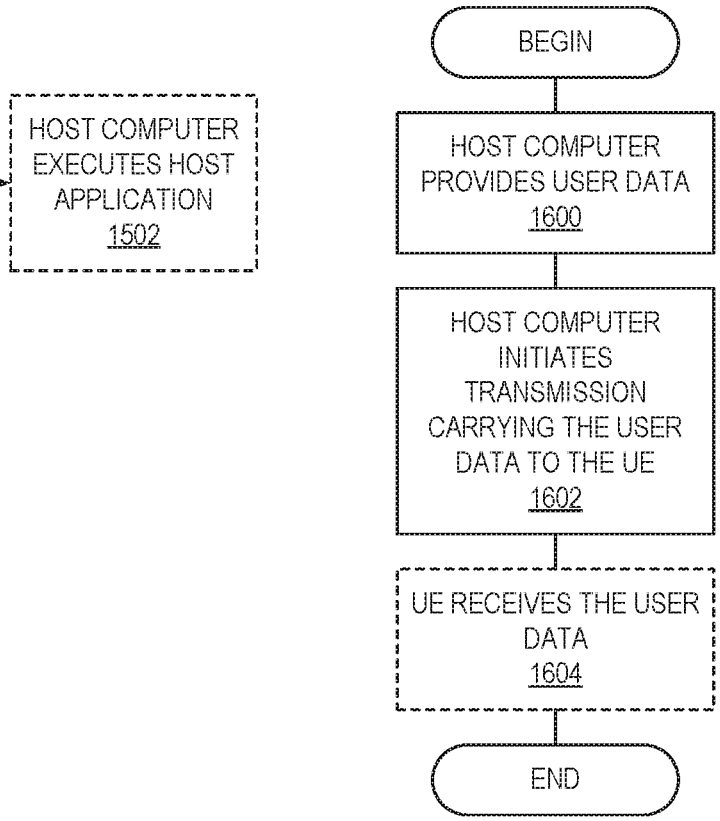

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally or alternatively, in step 1702 (which may be optional), the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

1. A method performed by a wireless device for determining precoding information, the method comprising:
   determining channel estimates for at least a channel between the wireless device and another device;
   determining a plurality of precoding hypotheses based on the channel estimates;
   determining a figure of merit for each of the plurality of precoding hypotheses; and
   determining the precoding information based on the figure of merit for each of the plurality of precoding hypotheses.
2. The method of embodiment 1 wherein the steps comprise:
   performing matched filtering of received reference symbols and corresponding known reference symbols;
   determining a plurality of precoding hypotheses based on the matched filtering;
   applying a transform to plurality of precoding hypotheses to produce a plurality of transformed precoding hypotheses;
   calculating a figure of merit for each of the plurality of transformed precoding hypotheses; and
   selecting a precoder that maximizes the figure of merit as the precoding information.
3. The method of any of embodiments 1 to 2 wherein the matched filtering is performed with at least one of the group consisting of: Sounding Reference Signal, SRS, Random Access Channel, RACH, and Demodulation Reference Signals, DMRS.
4. The method of embodiment 3 wherein the matched filtering is performed with SRS and a Zadoff-Chu sequence inverted.
5. The method of any of embodiments 1 to 4 wherein the plurality of precoding hypotheses are chosen from at least one of the group consisting of: a codebook, a Grid of Beams, GoB, codebook, a New Radio, NR, Type 1 codebook, and an NR Type 2 codebook.
6. The method of any of embodiments 1 to 5 wherein the transform is chosen from the group consisting of: a Discrete Fourier Transform, DFT, an Inverse DFT, a Discrete Cosine Transform, DCT, and an Inverse DCT.
7. The method of any of embodiments 1 to 5 wherein the transform is linear.
8. The method of any of embodiments 1 to 7 wherein the Figure of Merit, FOM, is a maximum.
9. The method of embodiment 8 wherein the maximum is only performed over a limited range.
10. The method of embodiment 9 wherein the limited range is related to at least one of the group consisting of: a cyclic prefix and a delay spread of the channel.
11. The method of any of embodiments 1 to 10 wherein the figure of merit is proportional to an estimated Signal to Noise Ratio, SNR.
12. The method of any of embodiments 1 to 11 wherein the wireless device operates in a NR communication network.
13. The method of any of embodiments 1 to 12 wherein the base station is a gNB.

14. The method of any of the previous embodiments, further comprising:
   providing user data; and
   forwarding the user data to a host computer via the transmission to the base station.

Group B Embodiments

15. A method performed by a base station for determining precoding information, the method comprising:
   determining channel estimates for at least a channel between the base station and another device;
   determining a plurality of precoding hypotheses based on the channel estimates;
   determining a figure of merit for each of the plurality of precoding hypotheses; and
   determining the precoding information based on the figure of merit for each of the plurality of precoding hypotheses.
16. The method of embodiment 15 wherein the steps comprise:
   performing matched filtering of received reference symbols and corresponding known reference symbols;
   determining a plurality of precoding hypotheses based on the matched filtering;
   applying a transform to plurality of precoding hypotheses to produce a plurality of transformed precoding hypotheses;
   calculating a figure of merit for each of the plurality of transformed precoding hypotheses; and
   selecting a precoder that maximizes the figure of merit as the precoding information.
17. The method of any of embodiments 15 to 16 wherein the matched filtering is performed with at least one of the group consisting of: SRS, RACH, and DMRS.
18. The method of embodiment 17 wherein the matched filtering is performed with SRS and a Zadoff-Chu sequence inverted.
19. The method of any of embodiments 15 to 18 wherein the plurality of precoding hypotheses are chosen from at least one of the group consisting of: a codebook, a Grid of Beams codebook, an NR Type 1 codebook, and an NR Type 2 codebook.
20. The method of any of embodiments 15 to 19 wherein the transform is chosen from the group consisting of: a DFT, and IDFT, a DCT, and an IDCT.
21. The method of any of embodiments 15 to 20 wherein the transform is linear.
22. The method of any of embodiments 15 to 21 wherein the figure of merit is a maximum.
23. The method of embodiment 22 wherein the maximum is only performed over a limited range.
24. The method of embodiment 23 wherein the limited range is related to at least one of the group consisting of: a cyclic prefix and a delay spread of the channel.
25. The method of any of embodiments 15 to 24 wherein the figure of merit is proportional to an estimated SNR.
26. The method of any of embodiments 15 to 25 wherein the base station operates in a NR communication network.
27. The method of any of embodiments 15 to 26 wherein the base station is a gNB.
28. The method of any of the previous embodiments, further comprising:
   obtaining user data; and
   forwarding the user data to a host computer or a wireless device.

Group C Embodiments

29. A wireless device for determining precoding information, the wireless device comprising:
   processing circuitry configured to perform any of the steps of any of the Group A embodiments; and
   power supply circuitry configured to supply power to the wireless device.

30. A base station for determining precoding information, the base station comprising:
   processing circuitry configured to perform any of the steps of any of the Group B embodiments; and
   power supply circuitry configured to supply power to the base station.

31. A User Equipment, UE, for determining precoding information, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

32. A communication system including a host computer comprising:
   processing circuitry configured to provide user data; and
   a communication interface configured to forward the user data to a cellular network for transmission to a User Equipment, UE;
   wherein the cellular network comprises a base station having a radio interface and processing circuitry, the base station's processing circuitry configured to perform any of the steps of any of the Group B embodiments.

33. The communication system of the previous embodiment further including the base station.

34. The communication system of the previous 2 embodiments, further including the UE, wherein the UE is configured to communicate with the base station.

35. The communication system of the previous 3 embodiments, wherein:
   the processing circuitry of the host computer is configured to execute a host application, thereby providing the user data; and
   the UE comprises processing circuitry configured to execute a client application associated with the host application.

36. A method implemented in a communication system including a host computer, a base station, and a User Equipment, UE, the method comprising:
   at the host computer, providing user data; and
   at the host computer, initiating a transmission carrying the user data to the UE via a cellular network comprising the base station, wherein the base station performs any of the steps of any of the Group B embodiments.

37. The method of the previous embodiment, further comprising, at the base station, transmitting the user data.

38. The method of the previous 2 embodiments, wherein the user data is provided at the host computer by executing a host application, the method further comprising, at the UE, executing a client application associated with the host application.

39. A User Equipment, UE, configured to communicate with a base station, the UE comprising a radio interface and processing circuitry configured to perform the method of the previous 3 embodiments.

40. A communication system including a host computer comprising:
   processing circuitry configured to provide user data; and
   a communication interface configured to forward user data to a cellular network for transmission to a User Equipment, UE;
   wherein the UE comprises a radio interface and processing circuitry, the UE's components configured to perform any of the steps of any of the Group A embodiments.

41. The communication system of the previous embodiment, wherein the cellular network further includes a base station configured to communicate with the UE.

42. The communication system of the previous 2 embodiments, wherein:
   the processing circuitry of the host computer is configured to execute a host application, thereby providing the user data; and
   the UE's processing circuitry is configured to execute a client application associated with the host application.

43. A method implemented in a communication system including a host computer, a base station, and a User Equipment, UE, the method comprising:
   at the host computer, providing user data; and
   at the host computer, initiating a transmission carrying the user data to the UE via a cellular network comprising the base station, wherein the UE performs any of the steps of any of the Group A embodiments.

44. The method of the previous embodiment, further comprising at the UE, receiving the user data from the base station.

45. A communication system including a host computer comprising:
   communication interface configured to receive user data originating from a transmission from a User Equipment, UE, to a base station;
   wherein the UE comprises a radio interface and processing circuitry, the UE's processing circuitry configured to perform any of the steps of any of the Group A embodiments.

46. The communication system of the previous embodiment, further including the UE.

47. The communication system of the previous 2 embodiments, further including the base station, wherein the base station comprises a radio interface configured to communicate with the UE and a communication interface configured to forward to the host computer the user data carried by a transmission from the UE to the base station.

48. The communication system of the previous 3 embodiments, wherein:
   the processing circuitry of the host computer is configured to execute a host application; and
   the UE's processing circuitry is configured to execute a client application associated with the host application, thereby providing the user data.

49. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

50. A method implemented in a communication system including a host computer, a base station, and a User Equipment, UE, the method comprising:

at the host computer, receiving user data transmitted to the base station from the UE, wherein the UE performs any of the steps of any of the Group A embodiments.

51. The method of the previous embodiment, further comprising, at the UE, providing the user data to the base station.

52. The method of the previous 2 embodiments, further comprising:

at the UE, executing a client application, thereby providing the user data to be transmitted; and at the host computer, executing a host application associated with the client application.

53. The method of the previous 3 embodiments, further comprising:

at the UE, executing a client application; and at the UE, receiving input data to the client application, the input data being provided at the host computer by executing a host application associated with the client application;

wherein the user data to be transmitted is provided by the client application in response to the input data.

54. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

55. The communication system of the previous embodiment further including the base station.

56. The communication system of the previous 2 embodiments, further including the UE, wherein the UE is configured to communicate with the base station.

57. The communication system of the previous 3 embodiments, wherein:

the processing circuitry of the host computer is configured to execute a host application; and the UE is configured to execute a client application associated with the host application, thereby providing the user data to be received by the host computer.

58. A method implemented in a communication system including a host computer, a base station, and a User Equipment, UE, the method comprising:

at the host computer, receiving, from the base station, user data originating from a transmission which the base station has received from the UE, wherein the UE performs any of the steps of any of the Group A embodiments.

59. The method of the previous embodiment, further comprising at the base station, receiving the user data from the UE.

60. The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AIC Akaike Information Criterion
ASIC Application Specific Integrated Circuit
CDL Cluster-Delay-Line
CPU Central Processing Unit
CSI Channel State Information
CSI-RS Channel State Information Reference Signal
DCT Discrete Cosine Transform
DFT Discrete Fourier Transform
DL Downlink
DMRS Demodulation Reference Signal
DSP Digital Signal Processor
FFT Fast Fourier Transform
FOM Figure of Merit
FPGA Field Programmable Gate Array
GoB Grid of Beams
gNB New Radio Base Station
IDCT Inverse Discrete Cosine Transform
IDFT Inverse Discrete Fourier Transform
IFFT Inverse Fast Fourier Transform
LTE Long Term Evolution
MF Matched Filtering
MIMO Multiple Input Multiple Output
MME Mobility Management Entity
MTC Machine Type Communication
NR New Radio
OTT Over-the-Top
PDP Power Delay Profile
P-GW Packet Data Network Gateway
PUCCH Physical Uplink Control Channel
RACH Random Access Channel
RAM Random Access Memory
ROM Read Only Memory
RRH Remote Radio Head
SCEF Service Capability Exposure Function
SNR Signal to Noise Ratio
SRS Sounding Reference Signal
TDD Time Division Duplexing
TDL Tap Delay Line
UE User Equipment
UL Uplink Those skilled in the art will recognize improvements and modifications to the embodiments of the present disclosure. All such improvements and modifications are considered within the scope of the concepts disclosed herein.

What is claimed is:

1. A method performed by a radio node for determining precoding information, the method comprising:

determining channel estimates for at least a channel between the radio node and another device;

determining a plurality of precoding hypotheses based on the channel estimates;

determining a Figure of Merit (FOM) for each of the plurality of precoding hypotheses;

determining the precoding information based on the FOM for each of the plurality of precoding hypotheses;

performing matched filtering of received reference symbols and corresponding known reference symbols;

filtering an output of the matched filtering based on a plurality of precoding hypotheses;

applying a transform to the filtered output for the plurality of precoding hypotheses to produce a plurality of transformed precoding hypotheses;

calculating a FOM for each of the plurality of transformed precoding hypotheses; and
selecting a precoder that maximizes the FOM as the precoding information.

2. The method of claim 1, wherein the matched filtering is performed with at least one of the group consisting of: a Sounding Reference Signal (SRS), a Random Access Channel(RACH), Demodulation Reference Signals (DMRS), a Channel State Information Reference Signal(CSI-RS), Physical Uplink Control Channel (PUCCH), and DMRS for PUCCH.

3. The method of claim 2, wherein the matched filtering is performed with the SRS and a Zadoff-Chu sequence inverted.

4. The method of claim 1, wherein the plurality of precoding hypotheses are chosen from at least one of the group consisting of: a codebook, a Grid of Beams (GoB) codebook, a New Radio (NR) Type 1 codebook, an NR Type 2 codebook, and a subset of any of these codebooks.

5. The method of claim 1, wherein the transform is chosen from the group consisting of: a Discrete Fourier Transform (DFT), an Inverse DFT, a Discrete Cosine Transform (DCT), and an Inverse DCT.

6. The method of claim 1, wherein the transform is linear.

7. The method of claim 1, wherein the FOM is a maximum.

8. The method of claim 7, wherein the maximum is only performed over a limited range.

9. The method of claim 8, wherein the limited range is related to at least one of the group consisting of: a cyclic prefix and a delay spread of the channel.

10. The method of claim 1, wherein the FOM is proportional to an estimated Signal to Noise Ratio (SNR).

11. The method of claim 1, wherein the radio node is a gNB, and the other device is a wireless device that operates in a NR communication network.

12. The method of claim 1, wherein the radio node is a gNB.

13. The method of claim 1, wherein the radio node is a wireless device that operates in a NR communication network.

14. The method of claim 1, wherein the radio node is a wireless device, and the another device is a gNB.

15. The method of claim 1, wherein the radio node is a base station.

16. The method of claim 1, wherein the radio node is a wireless device.

17. A base station for determining precoding information, the base station comprising:
one or more processors; and
memory comprising instructions to cause the base station to:
    determine channel estimates for at least a channel between the base station and another device;
    determine a plurality of precoding hypotheses based on the channel estimates;
    determine a Figure of Merit (FOM), for each of the plurality of precoding hypotheses;
    determine the precoding information based on the FOM for each of the plurality of precoding hypotheses;
    perform matched filtering of received reference symbols and corresponding known reference symbols;
    filter an output of the matched filtering based on a plurality of precoding hypotheses;
    apply a transform to the filtered output for the plurality of precoding hypotheses to produce a plurality of transformed precoding hypotheses;
    calculate a FOM for each of the plurality of transformed precoding hypotheses; and
    select a precoder that maximizes the FOM as the precoding information.

18. A wireless device for determining precoding information, the wireless device comprising:
one or more processors; and
memory comprising instructions to cause the wireless device to:
    determine channel estimates for at least a channel between the wireless device and another device;
    determine a plurality of precoding hypotheses based on the channel estimates;
    determine a Figure of Merit (FOM), for each of the plurality of precoding hypotheses;
    determine the precoding information based on the FOM for each of the plurality of precoding hypotheses;
    perform matched filtering of received reference symbols and corresponding known reference symbols;
    filter an output of the matched filtering based on a plurality of precoding hypotheses;
    apply a transform to the filtered output for the plurality of precoding hypotheses to produce a plurality of transformed precoding hypotheses;
    calculate a FOM for each of the plurality of transformed precoding hypotheses; and
    select a precoder that maximizes the FOM as the precoding information.

* * * * *